United States Patent [19]

Doman et al.

[11] Patent Number: 4,944,359
[45] Date of Patent: Jul. 31, 1990

[54] VEHICLE AND METHOD OF RELEASABLY COUPLING PARTS OF THE VEHICLE TOGETHER

[76] Inventors: Trevor D. Doman, 44, Birmingham New Road, Wolverhampton, West Midlands; John R. Buttery, 20 Maisons Place, Newport, Shropshire, both of United Kingdom; Royston M. Gould, 6 Muirfield Crescent, Oakham Green, Tividale, Warley, West Midlands, Great Britain

[21] Appl. No.: 225,238

[22] Filed: Jul. 28, 1988

[51] Int. Cl.⁵ .................. B62D 27/06; B62K 5/06; B62K 11/02

[52] U.S. Cl. .................... 180/208; 180/11; 280/481

[58] Field of Search ........... 180/208, 11, 13, 907, 180/210; 280/242 WC, 289 WC, 415.1

[56] References Cited

U.S. PATENT DOCUMENTS

| | | |
|---|---|---|
| 2,710,659 | 6/1955 | Moederle ..................... 180/11 |
| 4,452,327 | 6/1984 | Mowat et al. ................ 180/11 |
| 4,515,385 | 5/1985 | Christian ................ 280/289 WC |
| 4,708,219 | 11/1987 | Cresswell .................... 180/11 |
| 4,757,868 | 7/1988 | Cresswell .................... 180/11 |

FOREIGN PATENT DOCUMENTS 128448 12/1984 European Pat. Off. ........... 180/907

Primary Examiner—Mitchell J. Hill
Attorney, Agent, or Firm—Spensley Horn Jubas & Lubitz

[57] ABSTRACT

A wheelchair has a removable seat, removable battery containers and a body which can be separated into two major parts, one having a pair of ground-engaging wheels and the other having a single, steerable wheel. The body parts incorporate respective parts of a two-part coupling. One coupling part has recesses for receiving horizontal pins on the other coupling part. Lower pins serve as pivots during coupling. A pair of lower recesses are placed over co-axial lower pins and the body parts are then rocked about these pins to bring upper pins into their respective recesses. The pins are then locked in their recesses.

11 Claims, 3 Drawing Sheets

VEHICLE AND METHOD OF RELEASABLY COUPLING PARTS OF THE VEHICLE TOGETHER

SUMMARY OF THE INVENTION

The present invention provides a vehicle comprising first and second members releasably coupled together mechanically be a two-part coupling, the parts of which coupling are provided on respective ones of said members, wherein one part of the coupling has a first seat, the other part of the coupling has a first formation which bears on the seat and transmits gravitational loads between the members, wherein said other part of the coupling has a second formation spaced from the first formation, wherein said one part of the coupling has a further formation engaged with said second formation and wherein locking means is provided for releasably locking the first formation in engagement with the seat and the second formation in engagement with said further formation.

The invention is applicable to a wheelchair having one or more rear wheels on the first member and one or more front wheels on the second member. The invention enables the members of the wheelchair to be uncoupled and separated from each other for handling and transport of the wheelchair, for example in the trunk of an automobile.

The invention also provides a method of releasably coupling together two wheeled parts of a vehicle wherein said parts are pivotally connected by introducing a pivot on one of said parts into a first seat on the other of said parts, a formation on a first of said parts is then moved into a recess in a second of said parts by relative pivoting of the parts at the pivot and wherein the parts are then locked against reversal of said relative pivoting.

BRIEF DESCRIPTION OF THE DRAWINGS

An example of a wheelchair in accordance with the invention and which is used in performance of a method of embodying the invention will now be described, with reference to the accompanying drawings, wherein.

DESCRIPTION OF THE PREFERRED EMBODIMENT

Figure 1:
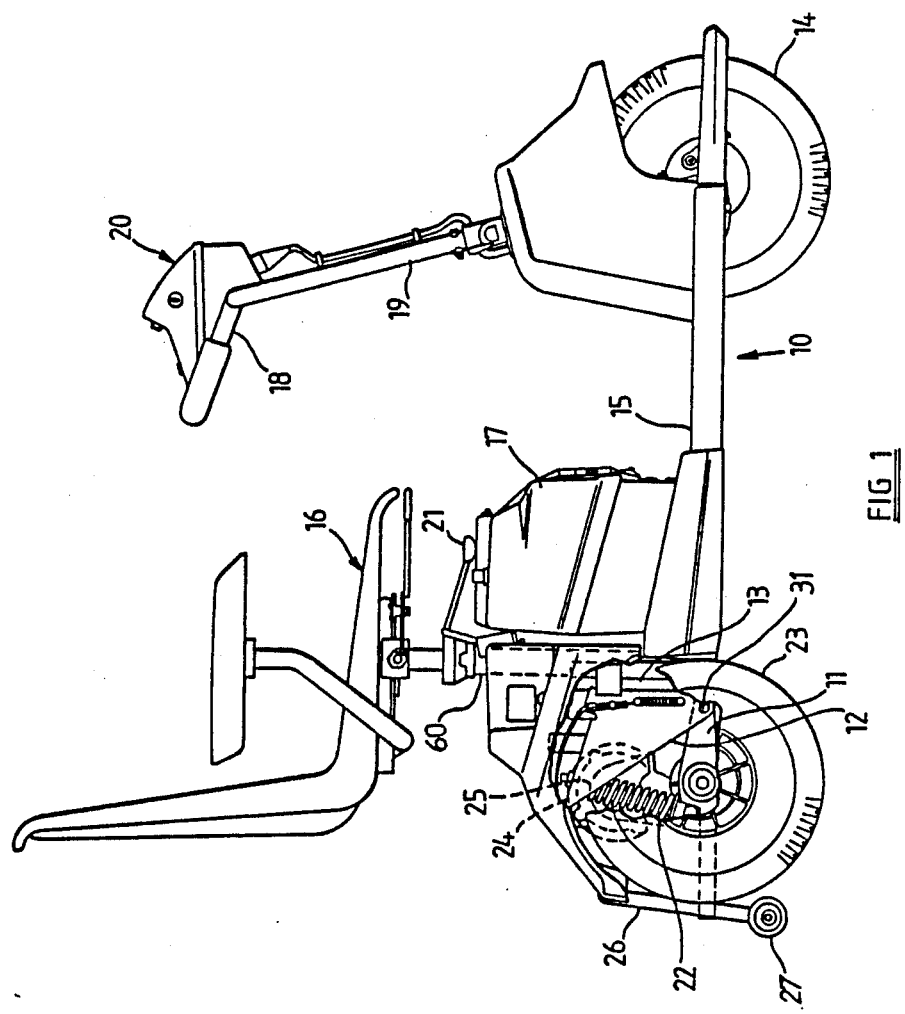
FIG. 1 shows a side view of the wheelchair.
Figure 2:
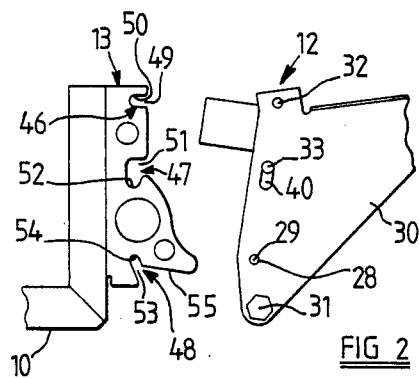
FIG. 2 shows diagrammatically certain parts of the wheelchair in an uncoupled condition.

The vehicle illustrated in the accompanying drawings comprises a front frame 10 and a rear frame 11 which are releasable coupled together by a two-part, releasable coupling. A first part 12 of the coupling is mounted on the rear frame and a second part 13 of the coupling is rigidly mounted on the front frame 10. There is also mounted on the front frame a steerable front wheel 14, a platform 15 a vertical tube 60 and a demountable seat 16 received in tube 60. The platform 15 supports electrical power supply means in the form of a rechargeable batteries contained in respective battery cases 17. The battery cases, containing their batteries, are also readily demountable from the platform 15.

A handlebar 18 is provided for steering the front wheel 14 and is connected with the wheel mounting structure by a foldable or demountable steering shaft 19. Drive control means 20 is mounted on the handlebar 18 and is connected by means of flexible cables and plug and socket connectors with other electrical components of the vehicle.

A foldable handle 21 is mounted on tube 60. When the vehicle is fully assembled, the handle 21 is folded down to lie below the seat 16. When the seat has been removed, in preparation for uncoupling of the front and rear frames, the handle 21 is raised so that it can conveniently be used for supporting the front frame 10 at a position immediately adjacent to the coupling.

The first coupling part 12 is connected with the rear frame 11 for movement relative thereto under the control of resilient suspension elements. In the example illustrated, there are two such suspension elements, each in the form of a coiled compression spring 22. These springs are positioned one adjacent to each side of the vehicle and are connected between the rear frame and the coupling part 12. This coupling part is also pivotally connected with the rear frame at a position spaced forwardly from the springs 22. Dampers are disposed inside the springs. The rear frame 11 is supported from the ground on a pair of co-axial, rear wheels 23. There is provided on or in the rear frame means for driving the wheels 23. The driving means includes an electric motor 24 and a gearbox 25 through which drive is transmitted from the motor to both of the wheels 23. Power for the motor is supplied from the batteries in the battery cases 17, under the control of the drive control 20. A brake is incorporated in the motor 24 in a known manner. Electrical and/or mechanical actuating means may be provided for actuating the brake and maintaining the brake in an applied condition, for example when the vehicle is parked.

Each of wheels 14 and 23 has a peripheral edge via which the wheel contacts the ground.

A bumper 26 projects rearwardly from the rear frame 11 to a position beyond the peripheries of the wheels 23. As shown, this bumper carries stop means in the form of rollers 27 which are normally spaced upwardly from the ground but which limit backward rocking of the rear frame 11, when the frames are uncoupled from each other.

The first coupling part 12 includes a pivot 28 which defines load receiving means in the form of a pivot axis 29 and which is held between a pair of plates 30 of the first coupling part. These plates are substantially flat, parallel to each other and are substantially vertical. Lower end portions of the plates 30 carry a pivot, by which the first coupling part is pivotally connected with the rear frame 11. This latter pivot defines a pivot axis 31 which is parallel to and which is spaced somewhat downwardly from the pivot axis 29.

An upper pin 32 extends between the plates 30 at a position near to upper margins of those plates. The pin 32 is at least approximately directly above the pivot 28 and may have the same form as does that pivot. At a position between the pivot 28 and the upper pin 32, there is provided an intermediate, horizontal pin 33 which also extends between the plates 30. The positions of the pivot 28 and the pin 32 are fixed with respect to the plates. The intermediate pin 33 can, however, be moved somewhat relative to the plates along a path which extends generally upwardly and downwardly. Opposite end portions of the intermediate pin pass through respective slots 40 in the plates 30. Travel of the intermediate pin towards and away from the pivot 28 is limited by the length of the slots 34. The intermediate pin is connected with the plates 30 by an arm 35 disposed between the plates and connected with the plates for pivoting relative thereto about an axis which is spaced rearwardly from the intermediate pin. The arm 35 embraces opposite end portions of the intermediate pin immediately adjacent to the plates 30. A central portion of the intermediate pin is spaced from the arm by a substantial gap.

Locking means is provided for locking the intermediate pin 33 in a selected end portion of each of the slots 34 and for moving the pin along those slots. The locking means is mounted on one of the plates 30 at the face thereof which is remote from the other plate 30. The locking means includes a rotary cam 36 having a handle 37, by means of which the cam can be turned relative to the first coupling part 12 through an angle of approximately 90° about an approximately horizontal axis. The cam 36 is pivoted on a stem 38 which extends downwardly from the cam through clearance holes in two guide plates 39,40. There is fixed on an intermediate part of the stem a movable plate 41 and a coiled compression spring 42 is interposed between this movable plate and the upper guide plate 39. The spring surrounds a portion of the stem 38. The spring 42 opposes upward movement of the stem and biases the stem downwardly. The cam 36 is formed with two flats, one of which is urged against the upper side plate 39 when the cam is in one extreme position and the other of which flats is urged against the upper guide plate 39 by the spring 42, when the cam is in its other extreme position. Accordingly, the spring opposes movement of the cam from either of its extreme positions.

The movable plate 41 is connected with the intermediate pin 33 by the core of a Bowden cable 43. The intermediate pin is biased downwardly relative to the plates 30 by an associated spring 44.

The plates 30 both lie adjacent to one of the rear wheels 23. These plates and the pivot 28, upper pin 32 and intermediate pin 33 are duplicated at the opposite side of the vehicle. The intermediate pin at this second side of the vehicle is connected with the movable plate 41 of the locking means by a second bowden cable 45.

The second coupling part 13 includes two arrays of formations, one array adjacent to each side of the vehicle. These arrays are aligned with and co-operate with respective sets of upper, intermediate and pivot pins of the first coupling part 12. Since the arrays of formations incorporated in the second coupling part 13 are identical with each other, only one of these arrays will be described. This array comprises upper, intermediate and lower recesses 46, 47 and 48 respectively. These recesses lie vertically one above the other and the spacing between them corresponds to the spacing between the upper pin 32, intermediate pin 33 and pivot 28. Thus, recess 46 and pin 32; recess 47 and pin 33; and recess 48 and pivot 28 constitute respective pairs of coupling formations, with pin 33 being a formation which is movable relative to each of pivot 28 and pin 32.

The upper recess 46 has a rearwardly facing mouth and a seat 50 spaced forwardly of the vehicle from the mouth. The size of the recess is such that the upper pin 32 can pass through the mouth 49 to bear against the seat 50.

The intermediate recess 47 also has a rearwardly facing mouth 51 and a seat 52. However, the seat 52 is spaced downwardly from the mouth 51 so that the recess 47 is generally "L" shaped, as viewed from one side of the vehicle. The lower recess 48 has a downwardly facing mouth and a seat 54 which is spaced upwardly from the mouth 53. There extends rearwardly from the mouth 53 for a distance which is a plurality of times greater than the distance across the mouth 53 a load-supporting surface 55. As shown in the drawing, this surface may incline somewhat downwardly in the rearward direction. The recesses 46, 47 and 48 are conveniently formed in and the surface 55 formed on a single piece of sheet metal which is welded or otherwise secured to the front frame 10.

When the vehicle is in a fully assembled condition, the pivot 28 is disposed in the lower recess 48 and bears against the seat 54 which constitutes a load-transferring surface for imposing a load from the front frame 10 on the pivot 28. The intermediate pin 33 is disposed in the intermediate recess 47 and bears against the seat 52. Accordingly, the second coupling part 13 is trapped between the pivot 28 and the intermediate pin 33 and the intermediate pin 33 constitutes a locking element. The upper pin 32 is disposed in the upper recess 46 and bears against the seat 50.

In preparation for uncoupling of the front and rear frames, the handle 37 is used to turn the cam 36 in a direction to raise the intermediate pin 33 from the seat 52 into horizontal alignment with the mouth 51. The rear frame 11 can then be rocked relative to the front frame 10 about the pivot axis 29 in a direction such that the upper pin 32 leaves the upper recess 46 and the intermediate pin 33 leaves the intermediate recess 47. The front frame 10 can then be lowered relative to the rear frame and moved slightly forwards relative to the rear frame to draw the pivot 28 from the lower recess 48. This completes uncoupling of the frames. The frames can then be placed separately in the trunk of an automobile.

Figure 3:
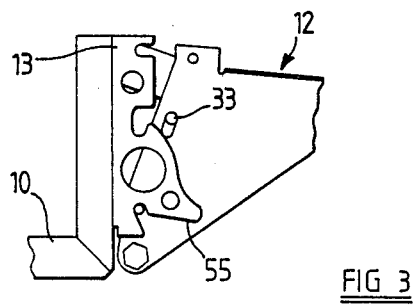
FIGS. 3, 4 and 5 illustrate diagrammatically successive stages in the coupling together of the parts shown in FIG. 2.
Figure 4:
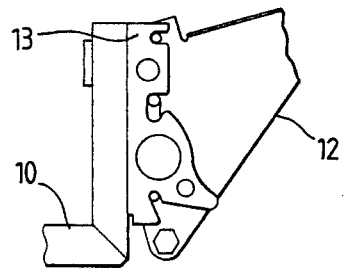
Figure 5:
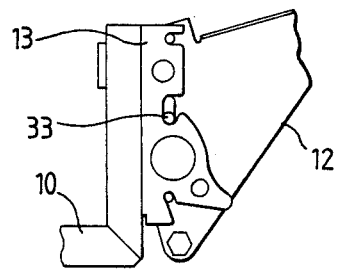
Figure 6:
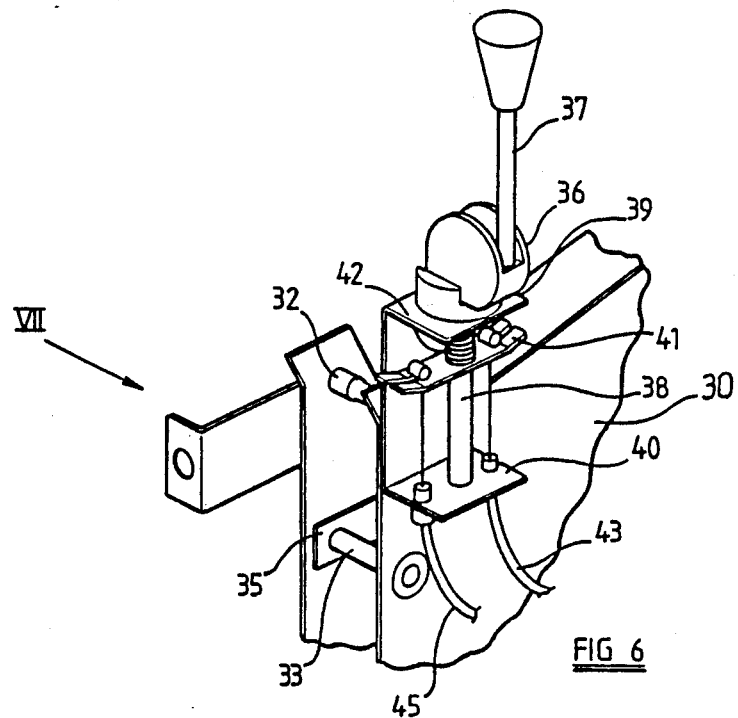
FIG. 6 is a perspective view of a part of the wheelchair, illustrating locking means.
Figure 7:
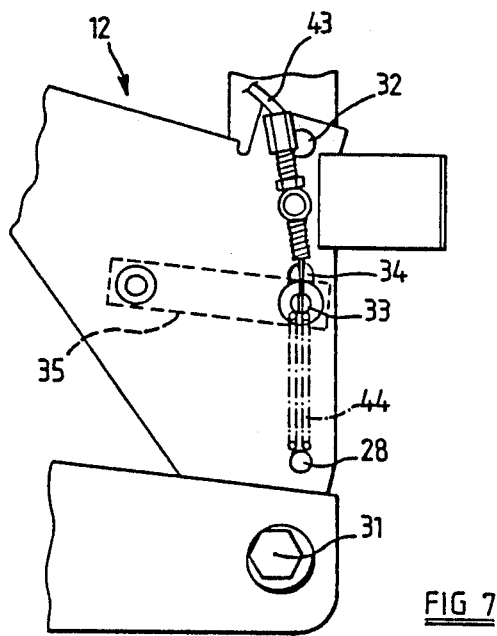
FIG. 7 shows certain parts of the wheelchair on the arrow VII of FIG. 6.

When the front and rear frames are required to couple together again, the intermediate pin 33 is set in its uppermost position by operation of the locking means and the arrays of formations incorporated in the second coupling part 13 are aligned with the respective arrays of pins incorporated in the first coupling part 12. The handle 21 is used to lift the second coupling part 13 from the ground until the load supporting surface 55 is at a level just above that of the pivot 28. The front and rear frames are then moved together until the surface 55 can rest on the pivot. The pivot 28 serves as a load-receiving element. The pivot is caused to slide along the surface 55 until the pivot enters the lower recess 48. During this procedure, the rear frame 11 is tilted rearwards somewhat, relative to its attitude in the fully assembled vehicle. Accordingly, the pivot 28 can move into engagement with the seat 54 whilst the intermediate pin 33 is still outside the intermediate recess 47. The front and rear frames are then pivoted relative to each other from the relation illustrated in FIG. 3 to the relation illustrated in FIG. 4. The relative pivoting of the frames occurs about the pivot axis 29. The rear frame 11, considered alone, rocks on its wheels 23. In consequence of this, the pivot axis 29 is lowered somewhat towards the ground.

When relative pivoting of the front and rear frames is completed, the upper pin 32 occupies the upper recess 46 and the intermediate pin 33 is disposed in the intermediate recess 47. The cam 36 is then turned by means of the handle 37 to drive the intermediate pin 33 downwardly onto the seat 52, thereby trapping the second coupling part 13. The front and rear frames are now coupled together in a manner which prevents relative movement of these frames entirely.

We claim:

1. A vehicle comprising front and rear members, front and rear ground-engaging wheels for supporting said members respectively, a two-part releasable coupling for coupling said members mechanically to each other, said coupling comprising two coupling parts, one of said parts being provided on the front member and the other of said parts being provided on the rear member, and stop means provided on said rear member for engaging the ground when the rear member is uncoupled from the front member and is rocked backwards, said stop means being disposed rearwards of the rear wheels, wherein said coupling part on the front member has a downwardly facing seat and said coupling part on the rear member has a load-receiving element on which the seat rests, wherein said coupling part on the rear member further includes a locking element which is spaced upwardly from the load-receiving element and is movable upwardly and downwardly to vary the vertical separation between the load-receiving element and the locking element and wherein said coupling part on the front member has an upwardly facing seat for receiving the locking element.

2. A vehicle according to claim 1 wherein said load receiving element is a pivot and defines a pivots axis about which the front member can pivot relative to the rear member when the downwardly facing seat rests on the pivot.

3. A vehicle according to claim 1 wherein said rear member has a pair of co-axial rear ground-engaging wheels, said wheels having an axis and a peripheral edge, and wherein said coupling includes coupling elements which lie nearer to the axis of the rear ground engaging wheels than does the peripheral edge of each of said wheels.

4. A vehicle according to claim 1 further comprising an electrical battery mounted on the front member of the vehicle to be readily demountable therefrom, wherein the rear member has a pair of co-axial rear ground-engaging wheels said wheels having an axis, and wherein said releasable coupling is disposed between the battery and the axis of said rear ground-engaging wheels.

5. A vehicle according to claim 1 wherein the rear member has a pair of co-axial rear ground-engaging wheels and resiliently deformable suspension means connected between said rear wheels and said coupling part on the rear member.

6. A vehicle according to claim 2 wherein said pivot includes a cylindrical pin having a diameter, and wherein said coupling part on the front member has a load-bearing surface extending from said seat in a rearwards direction for a distance which is a plurality of times greater than the diameter of the cylindrical pin.

7. A vehicle according to claim 5 wherein said downwardly facing seat is disposed above the level of the axis of the rear wheels.

8. A vehicle according to claim 4 wherein said downwardly facing seat is disposed above the level of the axis of the rear wheels.

9. A vehicle according to claim 1 wherein the front member has a handle disposed for supporting the front member when the front member is uncoupled from the rear member.

10. A vehicle according to claim 9 wherein the handle is a folding handle.

11. A vehicle comprising front and rear members, front and rear ground-engaging wheels for supporting said members respectively, a releasable coupling, composed of two coupling parts, for coupling said members mechanically to each other, one of said coupling parts being provided on the front member and the other of said coupling parts being provided on the rear member, said vehicle further comprising limit means provided on said rear member for engaging the ground when the rear member is uncoupled from the front member and is rocked backwards, said limit means being disposed rearwards of the rear wheels, wherein said coupling part on the front member has a downwardly facing seat and said coupling part on the rear member has a load-receiving element on which the seat rests, wherein said releasable coupling comprises:

a first coupling element provided on said front member and a second coupling element provided on said rear member, one of said first and second coupling elements being a first projection and the other of said first and second coupling elements being a first recess complementary with said first projection for receiving said first projection; and a third coupling element provided on said front member and a fourth coupling element provided on said rear member, one of said third and fourth coupling elements being a second projection and the other of said third and fourth coupling elements being a second recess complementary with said second projection for receiving said second projection;

wherein said first and second coupling elements are spaced from said third and fourth coupling elements in a reference direction; and wherein one of said coupling elements is movable relative to the member on which said one of said coupling elements is provided for varying the mutual separation, in the reference direction, between said one of said coupling elements and the other one of said coupling elements which is provided on the same member as said one of said coupling elements.

* * * * *